United States Patent [19]

Shemeta

[11] Patent Number: 4,869,091
[45] Date of Patent: Sep. 26, 1989

[54] TOOL FOR COLDWORKING HOLES

[75] Inventor: Paul J. Shemeta, Seattle, Wash.

[73] Assignee: The Boeing Company, Seattle, Wash.

[21] Appl. No.: 171,673

[22] Filed: Mar. 22, 1988

[51] Int. Cl.$^4$ .............................................. B21D 41/02
[52] U.S. Cl. ...................................................... 72/393
[58] Field of Search ............ 72/392, 393, 370, 453.19;
29/34 B, 243.53; 408/42, 44, 53; 227/51, 58

[56] References Cited

U.S. PATENT DOCUMENTS

| | | | |
|---|---|---|---|
| 4,144,625 | 3/1979 | Hogenhout | 29/243.53 |
| 4,180,195 | 12/1979 | Caley et al. | 227/51 |
| 4,365,401 | 12/1982 | Ogren | 29/243.53 |
| 4,515,302 | 5/1985 | Davern | 227/51 |
| 4,583,388 | 4/1986 | Hogenhout | 72/393 |
| 4,640,114 | 2/1987 | Kuless | 72/370 |
| 4,665,732 | 5/1987 | Hogenhout | 72/393 |
| 4,715,203 | 12/1987 | Wiegenstein | 72/453.16 |

*Primary Examiner*—Robert L. Spruill
*Attorney, Agent, or Firm*—Christensen, O'Connor, Johnson & Kindness

[57] ABSTRACT

A machine coldworking tool (10) for coldworking holes (13) in a metal structure (15) and adapted for mounting on a automated drilling and rivet installation machine (12). The tool (10) comprises a mandrel assembly (20) mounted within a housing (18) that is releasably engage with the machine (12) via a lock fitting (152) is operably engaged with the mandrel assembly (20) to insert a collapsible mandrel (40) through the hole (13). A rod (92) is attached to a rod pusher (98) that is urged by the lock fitting (152) to slide through the mandrel (40) to support the mandrel fingers (62). A lever (100) pivotally mounted to the mandrel holder (42) holds the rod pusher (98) and the rod (92) in place as the mandrel assembly (20) is pulled upward in the housing (18), thereby pulling the mandrel (40) back through the hole (13) and coldworking the metal structure (15) surrounding the hole (13).

16 Claims, 3 Drawing Sheets

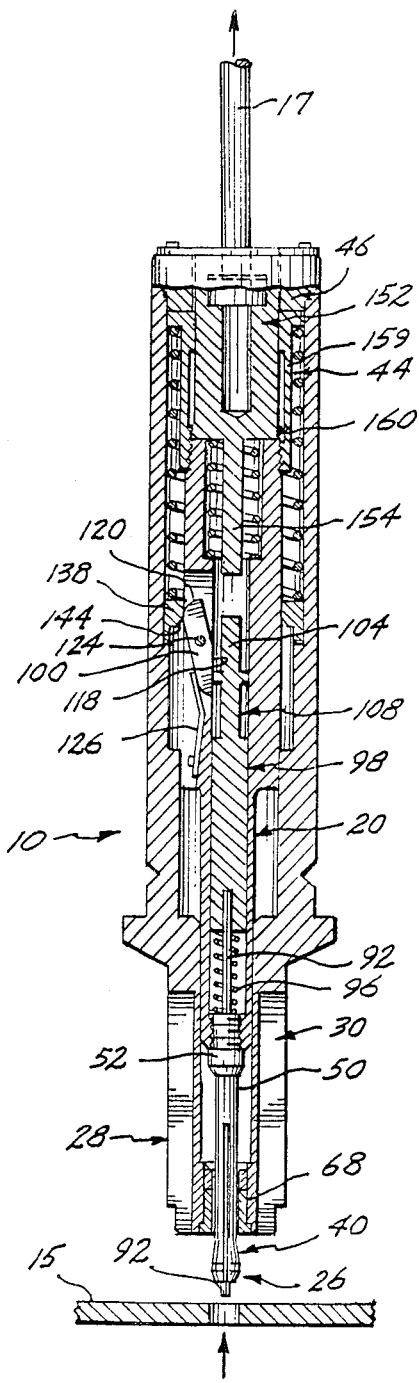
Fig.3C.
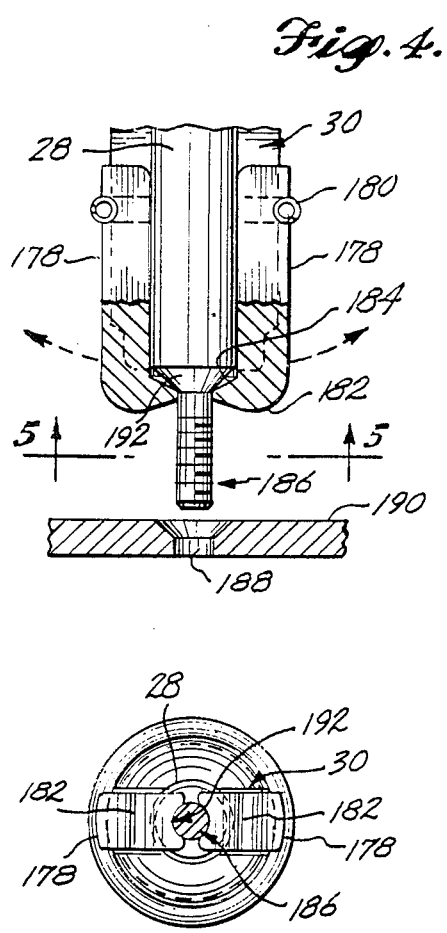
Fig.4.
Fig.5.

TOOL FOR COLDWORKING HOLES

TECHNICAL FIELD

This invention relates to a tool for coldworking holes and, more particularly, to a split-mandrel coldworking tool for use on an automated riveting machine.

BACKGROUND OF THE INVENTION

Many of the processes used for fabricating and assembling aircraft structures have become automated. This is the case with the installation of fasteners in aircraft wing panels wherein a multifunction machine accomplishes the task of drilling holes and installing the fasteners. One such machine, known as the "Gemcor," is manufactured by the General Electro-Mechanical Corporation of Buffalo, New York. The "Gemcor" utilizes a transfer head that selectively positions tools mounted thereon over the wing panels to accomplish the sequence of steps required to install a fastener. In a typical installation operation, the transfer head positions a motorized drill over the wing and a hole is drilled through the wing skin. The transfer head then removes the motorized drill and engages a rivet tool with a large hydraulically-operated cylinder on the machine. In operation, the rivet tool first picks up a rivet and the hydraulic cylinder then causes the rivet tool to push the rivet into the hole. A bucking cylinder is positioned on the reverse side of the wing to form the shop head on the rivet. Finally, the transfer head disengages the rivet tool from the hydraulic cylinder and positions a shaver over the rivet tool to trim the rivet head on the top side of the wing.

Although the "Gemcor" machine functions well to install rivets, it is unsuitable for installing bolts and other similar fasteners where coldworking of the hole is required to resist localized stress concentrations. Briefly, coldworking is the process of plastically deforming metal at a temperature below its annealing point in order to increase its hardness and tensile strength. Several methods can be used for coldworking the fastener holes. One method pushes a shaft having an enlarged diameter portion (commonly referred to as a mandrel) through a hole from one directions to radially expand the hole and compress the region surrounding it to thereby achieve the desired strain hardening. Another method involves lining the hole with a sleeve and pulling a mandrel through the sleeve to expand and thereby coldwork the hole. Yet another method includes inserting a collapsible mandrel (also known as a split mandrel) in collapsed form through the fastener hole, expanding the mandrel, and then pulling the mandrel back through the hole to coldwork the hole.

Attempts to use a solid mandrel coldworking tool on the Gemcor have been unsuccessful. The actuating mechanism of the Gemcor is located on the top side of the wing panel, and thus, the mandrel must first be pushed through the fastener hole from the top side of the wing panel and then pulled back through the hole. This leaves a protruding ridge of metal on the reverse side of the hole that causes premature weakening of the metal around the hole when the wing panel is under stress.

The use of a sleeved mandrel has also proven unsatisfactory because of the difficulty in automatically placing sleeves over the mandrel prior to coldworking and then removing the sleeve out of the hole after coldworking. In addition, the metal sleeves are costly to supply in large numbers.

While the split mandrel coldworking tool is ideally suited for this application, there is no known mechanism that permits it to be used on the Gemcor machine. The present invention solves this long standing problem and fulfills a significant need in the industry.

SUMMARY OF THE INVENTION

In accordance with the present invention a coldworking tool to facilitate the automated coldworking of a hole in a metal surface is provided. The tool comprises a housing having a first end and a second end, with the first end of the housing having an engaging means for releasably mounting the housing to a powered cylinder machine such as the "Gemcor." The tool further comprises a mandrel means slidably received within the housing comprising a collapsible mandrel positioned within the second end of the housing that collapses from an original configuration, support means for supporting the mandrel in the original configuration, and a coupling positioned in the first end of the housing for coupling the mandrel means to the powered cylinder. When the cylinder pushes on the coupling, the mandrel is first thrust out of the second end of the housing and collapses as it goes through the hole and then returns to its original configuration. Second, the mandrel is supported by the support means in the original configuration. The tool further comprises a locking means for holding the mandrel in the original configuration so that as the cylinder next pulls on the coupling, the supported mandrel is pulled back through the hole, thereby coldworking the hole. The locking means is further configured to permit the support means to retract after the mandrel has been pulled through the hole.

In accordance with another aspect of the present invention, the mandrel has a first end that is pushed through the hole, a second end that is connected to the support means, and an internal axial bore having an internal diameter at its first end which is smaller than its internal diameter at its second end. The support means preferably includes a rod slidably received within the internal axial bore of the mandrel having an outside diameter larger than the inside diameter at the first end of the mandrel and a rod pusher for pushing the rod through the mandrel to support the mandrel in the original configuration.

In accordance with yet another aspect of the present invention, the locking means comprises a lever, a biasing means for biasing the lever against the rod pusher and a groove on the rod pusher for receiving the lever when the rod pusher has pushed the rod through the mandrel to thereby hold the rod within the mandrel as the mandrel is pulled through the hole. The locking means further includes a lever release means for removing the lever from the groove on the rod pusher after the mandrel is pulled through the hole to thereby permit the rod to be removed from the internal axial bore at the first end of the mandrel to allow the mandrel to collapse.

In accordance with still yet another aspect of the present invention, the tool further comprises a biasing means, preferably in the form of a spring, for holding the mandrel within the housing when the coldworking tool is not connected to the power cylinder machine.

In accordance with still yet another aspect of the present invention, the coldworking tool further comprises fingers mounted on the outside of the second end of the housing for gripping and holding the head of a fastener against the housing so that as the housing is pushed by the machine toward the hole, the fastener is forced into and through the hole by the housing. Preferably, the fingers are configured so that as the housing is pulled away from the hole by the machine, the fastener will be released from the grip of the fingers.

As will be readily appreciated from the foregoing descriptions, the invention provides a unique split mandrel coldworking tool for use on a Gemcor or other similar machine. The configuration of the tool housing facilitates mounting of the tool on the transfer head of the Gemcor. Because the tool is adaptable for use on the Gemcor, the predrilled fastener hole can be coldworked from one side of the wing surface. Also, because the split mandrel can be pulled back through the hole in the supported configuration, a subsequent counter-drilling operation will remove any protruding ridge formed by the split mandrel. Finally, the mounting of the fingers on the housing enables the tool to be used for grasping and installing a fastener in the coldworked hole.

BRIEF DESCRIPTION OF THE DRAWINGS

The foregoing and other features and advantages of the present invention will be more readily appreciated as the same becomes better understood by reference to the following detailed description, when taken in conjunction with the accompanying drawings, wherein:

FIGS. 3A-C are cross-sectional views of the tool of FIG. 2 showing the sequence of steps in coldworking a hole;

FIG. 4 is an enlarged partial cross-sectional view of the nose portion of the tool showing the slidable fingers gripping a headed fastener; and FIG. 5 is a bottom plan view of the embodiment illustrated in FIG. 4.

DESCRIPTION OF THE PREFERRED EMBODIMENT

Figure 1:
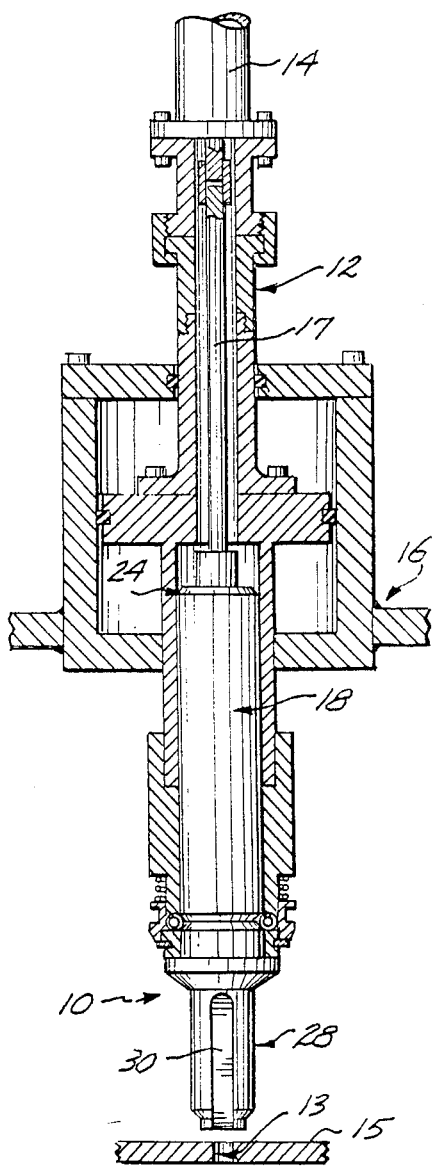
FIG. 1 is a pictorial side view in partial cross section of a coldworking tool formed in accordance with the present invention as installed on a Gemcor machine and positioned above a work surface.

With reference to FIG. 1, the machine coldworking tool 10, formed in accordance with the present invention, is shown mounted on a Gemcor automated drilling and rivet installation machine 12 positioned above a hole 13 formed in a workpiece 15. The Gemcor machine 12, as partially illustrated, includes a hydraulic cylinder 14 and a transfer head assembly 16 that releasably grips the tool 10 and moves the tool 10 into engagement with a cylinder extension 17 projecting from the hydraulic cylinder 14.

Figure 2:
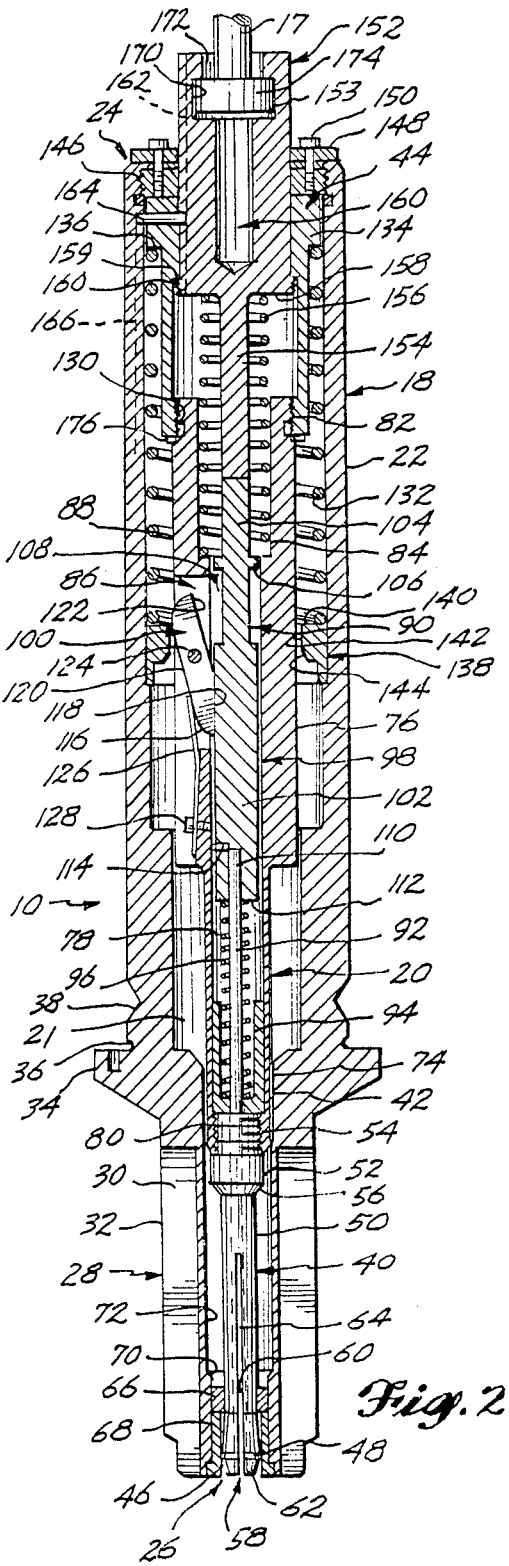
FIG. 2 is an enlarged, cross-sectional view of the tool of FIG. 1.

As is more clearly shown in FIG. 2, the coldworking tool 10 comprises a housing 18 and a mandrel assembly 20 slidably mounted therein. The housing 18 has cylindrically shaped sidewalls 22 with an open upper end 24 and an open lower end 26 that define an open interior 21. Formed on the lower end 26 is a nosepiece 28 having grooves 30 in the outside surface 32 to assist in installing fasteners, as will be described more fully hereinafter. Located upwardly from the lower end 26 is a collar 34 projecting outwardly from the sidewalls 22. Immediately above the collar 34 is an annular groove 36 and an annular V-shaped notch 38 formed in the sidewalls 22.

The collar 34, groove 36 and notch 38 facilitate engagement and release of the tool 10 by the transfer head assembly 16.

The mandrel assembly 20 comprises a mandrel 40 threadably engaged to an elongate mandrel holder 42 that in turn is threadably engaged to a holder extension 44. The mandrel 40 has a nose section 46, the diameter of which gradually increases to a maximum at an enlarged portion 48. The diameter then decreases upwardly from the enlarged portion 48 and becomes a constant diameter slightly greater than the initial diameter of the nose section. The diameter remains constant to form a pilot section 50 that is contiguous to the nose section 46. The pilot section 50 then slopes sharply outwardly to an enlarged end 52 that has an upwardly extending threaded portion 54. The slope between the pilot section 50 and the enlarged mounting end 52 forms a beveled face 56.

An internal axial bore 58 extends the entire length of the mandrel 40. The diameter of the internal axial bore 58 is smaller within the nose section 46 than within the pilot section 50. An internal shoulder 60 located above the nose section 46 denotes the point of change in the diameter. The nose section 46 and the lower two thirds of the pilot section 50 are longitudinally slotted to split the mandrel 20 into four fingers 62 that can collapse from the original configuration shown in FIG. 2. As shown, the slots 64 extend through the mandrel 20 to communicate with the internal axial bore 58.

A pilot bushing 66 and a nose bushing 68 are press fit into the lower end 26 of the housing 18. The internal diameter of the pilot bushing 66 is slightly smaller than the outside diameter of the enlarged portion of the nose section 48, while the nose bushing 68 has an internal diameter sized to accommodate the enlarged portion 48. Immediately above the pilot bushing 66 the inside diameter of the housing 18 increases, forming an angled face 70 on the inside surface 72 of the lower end 26 of the housing that matches the angle of the beveled face 56 on the mandrel 40.

The mandrel holder 42 is substantially cylindrical, having a small diameter lower section 74 that steps up to an enlarged diameter upper section 76. A cylindrical open interior 78 extends longitudinally through the mandrel holder 42. The lower end 80 of the lower section 74 is internally threaded to receive the threaded portion 54 of the mandrel 40. The exterior of the upper end 82 of the upper section 76 is externally threaded to threadably engage the holder extension 44. The internal diameter of the open interior 78 is constant from the lower end 80 to approximately the last third of the upper section 76, where it then increases, forming a step 84. An elongate opening 86 is formed in the exterior wall 88 of the upper section 76. The elongate opening 86 communicates with the open interior 78.

Mounted within the mandrel holder 42 is a rod support assembly 90 that includes a cylindrical rod 92, a rod bushing 94, a cylindrical rod spring 96, a rod pusher 98, and a lever 100. The rod bushing 94 is press-fit into the interior 78 of the mandrel holder 42 above the threaded lower end 80. The rod 92 is sized to pass through the rod bushing 94, into the internal axial bore 58 of the mandrel 40, and through the internal shoulder 60. The rod spring 96 is a coiled spring that fits over the rod 92 and is positioned between the rod bushing 94 and the rod pusher 98 to urge the rod pusher 98 away from the rod bushing 94. The rod pusher 98 comprises a lower half 102 and an upper half 104. The lower half 102 is sized to slide within the open interior 78 of the mandrel holder 42. The upper half 104 is approximately one-half the diameter of the lower half 102. An annular ring 106 is integrally formed at the midpoint of the upper half 104, defining a channel 108 formed circumferentially about the rod pusher 98. An internal axial opening 110 is formed in the lower face 112 of the rod pusher 98 into which the rod 92 is inserted and held in place by a set screw 114.

The lever 100 is formed of an elongate bar having an acutely angled nose formed by faces 115 and 118, a flat side 122, and curved face 120. The lever 100 is pivotably mounted about a pivot pin 124 within the elongate opening 86 in the mandrel holder 42. When so mounted, the oblique face 118 rests upon the lower half 102 of the rod pusher 98. A spring bar 126, mounted to the mandrel holder 42 by a fastener 128, bears on the surface 120 of the lever 100 to urges the oblique face 118 into contact with the rod pusher 98.

The holder extension 44 is cylindrically shaped, having an internally threaded bottom section 130 and an externally threaded top section 134. The internally threaded bottom section 130 is threadably engaged with the mandrel holder 42. The outside diameter of the bottom section 130 is sized to permit a coiled holder spring 132 to be placed over the outside thereof. The top section 134 of the holder extension 44 has an outside diameter slightly larger than the diameter of section 130, thus forming a ledge 136 against which one end of the holder spring 132 bears. A ring 138 is press-fit to the inside surface 72 of the housing 18. The ring 138 has an upward facing top surface 140 against which the other end of the holder spring 132 bears. In addition, the ring 138 has a radially inward surface 142 that functions as a bearing surface for the mandrel holder 42, and a lower inclined surface 144 that cooperates with the lever 100, as will be described more fully hereinafter.

When the mandrel assembly 20 is placed inside the housing 18, the coiled holder spring 132 will be slightly compressed between the ledge 136 on the holder extension 44 and the top surface 140 of the ring 38, thereby urging the mandrel assembly 20 upwardly in the housing 18. The mandrel assembly 20 is retained in the housing 18 by a retainer ring 146 that is threaded onto the upper end 24 of the housing 18. A cap plate 148 is fastened to the retainer ring 146 by bolts 150 to hold the retainer ring 146 in position in the housing 18.

A lock fitting 152 is shown slidably fitted in the holder extension 44 and projecting upwardly past the cap plate 148. The lock fitting 152 has cylindrically shaped outside walls 153 that are sized to slide within the top section 134 of the holder extension 44 and through the retainer ring 146. External construction threads 160 are formed on the lower portion of outside walls 153 that permit threading of the lock fitting 152 through the internally threaded bottom section 130 on the holder extension 44 to facilitate the initial assembly of the tool 10. An integrally formed cylindrical push rod 154 projects downward from the lock fitting and bears against the cylindrical upper end 104 of the rod pusher 98. The integrally formed push rod 154 has an outside diameter substantially equal to that of the upper end 104 of the rod pusher 98. A coil spring 156 fits over the push rod 154 and bears against the lower face 158 of the lock fitting 152 and against the step 84 on the mandrel holder 42. The spring 156 urge the lock fitting 152 upwardly within the holder extension 44 to thereby hold the mandrel 40 within the housing 18 when the cylinder extension 17 is removed from the lock fitting 152. The lock fitting 152 is prevented from being pushed completely out of the holder extension 44 by the external construction threads 160 on the lock fitting 152 contacting a lip 159 formed on the lower section 134 of the holder extension 44.

A longitudinal channel 162 (shown in phantom) is formed on the outside walls 153 of the lock fitting 152. An index pin 164 projects through the back section 134 of the holder extension 44 into the channel 162. The index pin 164 slides in longitudinal channel 162 to permit the lock fitting 152 to prevent rotation of the lock fitting 152 as it slided within the holder extension 44. In addition, the index pin 164 projects outwardly into a housing channel 166 formed on the inside surface 72 of the housing 18. The housing channel 166 is longitudinally oriented to prevent rotation of the rod support assembly 90 as it slides within the housing 18.

An internal axial bore 168 commences from the top end of the lock fitting 152 and extends partially therethrough. The bore 168 is suitably shaped to facilitate engagement and disengagement of the cylinder extension 17 with the tool 10. More particularly, the cylinder extension 17 has a rectangularly-shaped fitting 174 near the end thereof. The upper end of the bore 168 has an opening 172 with a rectangular cross-sectional configuration that is sized to slidably receive the fitting 174. Immediately below the opening 172 is an internal groove 170 that is sized and shaped to permit the fitting 174 to be at least partially rotated within the bore 168 after it is inserted through the opening 172 to effect locking engagement of the cylinder extension 17 with the lock fitting 152. Disengagement is accomplished by first rotating the cylinder extension 17 until the fitting 174 is aligned with the opening 172 and then withdrawing the cylinder extension 17 from the bore 168. It is to be understood that the fitting 174 and the bore 168 may be configured other than as specifically described herein to effect locking engagement of the cylinder extension 17 and the lock fitting 152.

Operation

Figure 3A:
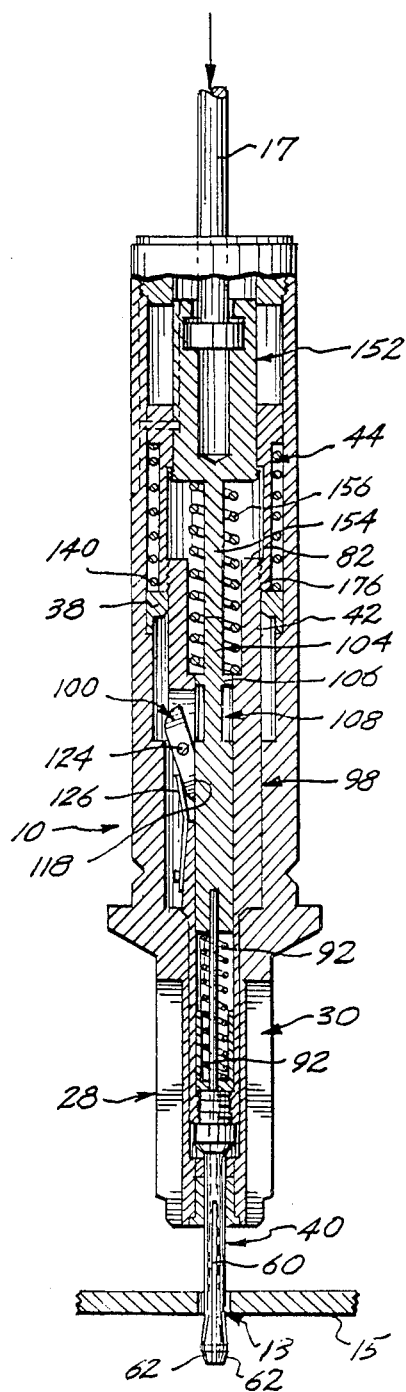
Figure 3B:
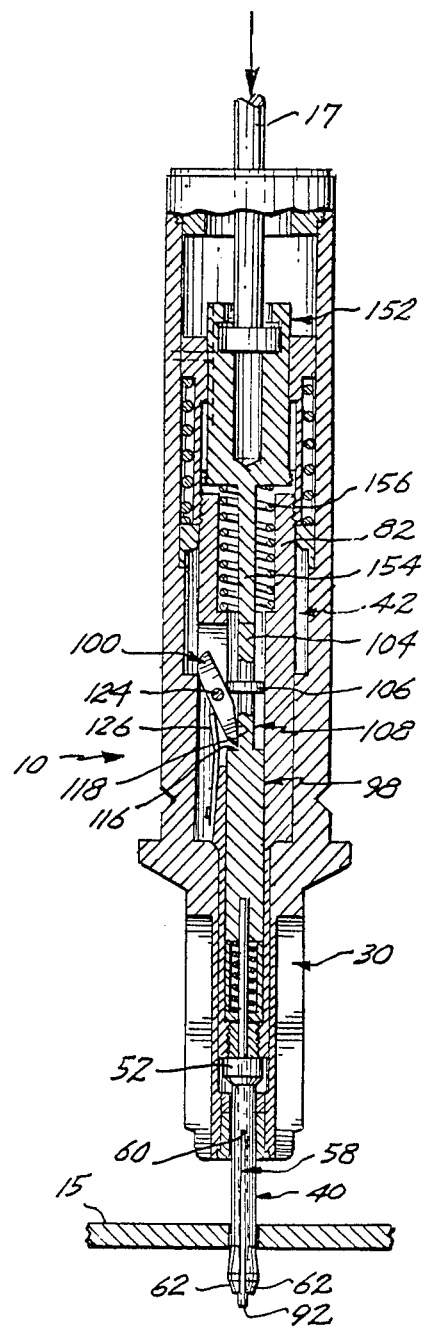

Reference will again be made to FIG. 2 and further to FIGS. 3A–C in describing the operation of the tool 10. With the cylinder extension 17 engaged with the lock fitting 152, the hydraulic cylinder 14 can push on the cylinder extension 17 to exert a downward force on the lock fitting 152. This force will be transmitted from the lock fitting 152 to the coil spring 156, the mandrel holder 42, and the mandrel extension 44. The coil spring 156 is stiffer than the coil spring 132, thus the force transmitted to the lock fitting 152 will cause the entire split mandrel assembly 20 to slide downward in the housing 18.

Consequently, the mandrel 40 will be thrust out of the nosepiece 28 and through the hole 13 in the workpiece 15 as shown in FIG. 3A, collapsing from the original configuration. The mandrel 40 continues to travel through the hole 13, returning to the original configuration, until the flange 176 on the upper end 82 of the mandrel holder 42 contacts the top surface 140 of the ring 138. At this point the mandrel 40 has reached its full extension through the hole 13 in the workpiece 15 as depicted in FIG. 3A.

Referring now to FIG. 3B, as the cylinder extension 17 continues to exert a downward force on the lock fitting 152, the coil spring 156 compresses, allowing the lock fitting 152, to slide downward within the holder extension 44. As the lock fitting 152 begins moving downward in the holder extension 44, the push rod 154 on the lower portion of the lock fitting 152 pushes on the top of the rod pusher 98 to force the rod 92 through the internal axial bore 58 of the mandrel 40. As the lock fitting 152 moves toward the upper end 82 of the mandrel holder 42, the rod 92 slides past the shoulder 60 in the internal axial bore 58 of the mandrel 40 to support the four fingers 62. When the lock fitting 152 comes into contact with the upper end 82 of the mandrel holder 42, the channel 108 in the rod pusher 98 is moved adjacent the oblique face 118 of the lever 100. The spring bar 126 exerts a force on the lever 100 to cause it to pivot about the pivot pin 124 and fall into the aligned channel 108. With the lever 100 resting in the channel 108, the angled front face 116 of the lever 100 bears against the bottom face of the channel 108 to hold the rod pusher 98 in position and prevent it from being pushed upward by the compressed rod spring 96. With the rod 92 supporting the four fingers 62 in the original configuration, the mandrel 40 can now be pulled back through the hole 13 in the workpiece 15 to thereby coldwork the hole 13.

To pull the expanded mandrel 40 through the hole 13, the lock fitting 152 is now pulled upward by the hydraulic cylinder 14 as shown in FIG. 3C. As the lock fitting 152 initially moves upward, the push rod portion 154 comes out of contact with the upper half 104 of the rod pusher 98. As the lock fitting 152 continues moving upward, the external construction threads 160 contact the lip 159 on the holder extension 44, and the entire mandrel assembly 20 is then pulled upward, causing the supported mandrel 40 to be pulled through the hole 13, thereby coldworking the hole 13.

Once the mandrel 40 has coldworked the hole 13, the rod 92 must be retracted. To accomplish this, the curved face 120 of the lever 100 contacts the inclined surface 144 of ring 138 as it moves upwardly thereby causing the lever 100 to pivot about the pivot pin 124. This raises the oblique face 118 of the lever 100 out of the channel 108 on the rod pusher 98. When this occurs, the compressed rod spring 96 immediately urges the rod pusher 98 upward into contact with the push rod 154. This movement withdraws the rod 92 from the mandrel 40, permitting the mandrel 40 to retract into the housing 18. As lock fitting 152 continues to be pulled upward, the holder extension 44 contacts the retainer ring 146, preventing further upward movement of the mandrel assembly 20.

FIGS. 4 and 5 illustrate an alternative embodiment of the tool 10, wherein two fingers 178 are slidably mounted in the grooves 30 in the outside surface 32 of the nosepiece 28. A retention spring 180 holds the fingers 178 in the grooves 30. The fingers 178 have a gripping portion 182 with an angled contact face 184 to facilitate the retrieval and insertion of a fastener 186 in a previously coldworked opening 188 in a workpiece 190. The gripping portion 182 of the fingers 178 are shown having circular cutouts 192 in their engaging faces to facilitate gripping of the fastener 186.

The fingers 178 permit the tool 10 to be used not only for coldworking the hole but for inserting the fastener into the hole. In this operation, the fastener 186 is held with the fastener head 192 abutting the nosepiece 28. The entire tool 10 is then pushed toward the workpiece 190 to force the fastener 186 through the opening 188. As the fingers 178 contact the workpiece 190, they spread apart and allow the fastener 186 to be fully inserted into the opening 188.

While a preferred embodiment of the invention has been illustrated and described, it will be appreciated that various changes can be made therein without departing from the spirit and scope of the invention. For instance, a catch lever may be substituted for the coiled fitting spring 156 to hold the lock fitting in position with respect to the mandrel assembly 20 as the mandrel 40 is initially extended through the hole in the workpiece. After the mandrel has been extended through the hole, the catch lever would be released in a similar fashion to the release of the catch 100, thus permitting the lock fitting to continue its downward movement and push the rod 92 through the mandrel 40. Furthermore, the present invention may also be used on expandable mandrels, i.e., mandrels that, after they have been pushed through the hole, have fingers that expand radially outward by a rod pushed through an axial bore in the mandrel. In this application the mandrel expansion assembly is substantially the same with the difference being in the construction of the mandrel. Consequently, the invention can be practiced otherwise than as specifically described herein.

The embodiments of the invention in which an exclusive property or privilege is claimed are defined as follows:

1. A coldworking tool for coldworking a hole in a workpiece by a riveting machine, the tool comprising:
   (a) a housing having means for releasably and operably engaging the riveting machine;
   (b) a collapsible mandrel mounted within said housing and configured to alternate from an original configuration to a supported configuration, said mandrel also being movable by said machine between a first position, wherein said mandrel is retracted within said housing, an intermediate position, wherein said mandrel is partially extended out of said housing but not through the hole to be coldworked, and a second position, wherein said mandrel is extended out of the housing and through the hole;
   (c) support means slidable within said collapsible mandrel for supporting said mandrel from collapsing when said mandrel is in the second position; and
   (d) locking means for maintaining said mandrel in the supported configuration when said mandrel is moved from said second position to said intermediate position to prevent said mandrel from collapsing to thereby coldwork the hole.

2. The coldworking tool of claim 1, wherein said locking means is further configured to unlock to permit said mandrel to return to said original configuration after said mandrel has moved to said intermediate position.

3. The coldworking tool of claim 1, further comprising a coupling means positioned in the housing for releasably and operably coupling said mandrel to an activating means of the riveting machine.

4. The coldworking tool of claim 3, further comprising biasing means for holding said mandrel in said first position when the coldworking tool is uncoupled from the riveting machine.

5. The coldworking tool of claim 4, wherein said biasing means comprises a spring member.

6. The coldworking tool of claim 4, wherein said housing is moveable by said machine, the tool further comprising gripping means mounted on the housing for gripping a headed fastener and holding the head of the fastener against the housing so that as the housing is moved by the machine towards the coldworked hole, the fastener is inserted into the coldworked hole, and the fastener is released from the gripping means as the fastener is seated in the coldworked hole.

7. A tool for coldworking a hole in a workpiece by a riveting machine, the tool comprising:
   (a) a housing having a first end and a second end, the first end of the housing having an engaging means for releasably engaging the housing with the riveting machine;
   (b) a collapsible mandrel having a first end adapted to be pushed through the hole, a second end, and an internal axial bore, the collapsible mandrel being configured to alternate from an original configuration to a supported configuration, said collapsible mandrel positioned within the first end of said housing for movement between a first position, wherein said mandrel is retracted within said housing, an intermediate position, wherein said mandrel is partially extended out of the housing but not through the hole, and a second position, wherein said mandrel is extended out of the housing and through the hole in the workpiece;
   (c) support means extending through said axial bore and engaged with the first end of said expandable mandrel for supporting said mandrel when said mandrel is moved from the second position to the intermediate position;
   (d) coupling means positioned in the second end of said housing for coupling said mandrel to the machine for movement of said mandrel between said first, intermediate, and second positions;
   (e) locking means for locking said support means to hold said mandrel in the supported configuration when said mandrel is retracted from said second position to said intermediate position to prevent said mandrel from collapsing to thereby coldwork the hole and for unlocking said support means after said mandrel has moved to said intermediate position.

8. The coldworking tool of claim 7, wherein said support means includes a rod slidably receivable within the internal axial bore of said mandrel and a rod pusher attached at one end to said coupling means and engaged with said rod at the other end such that when said coupling means pushes said rod pusher, said rod pusher moves said rod through the internal axial bore of said mandrel to thereby support said mandrel in the original configuration.

9. The coldworking tool of claim 8, wherein said locking means comprises a lever, a biasing means for biasing said lever against said rod pusher, and a groove on said rod pusher for receiving said lever when said rod pusher has pushed said rod through said mandrel such that said rod is held within said mandrel as said mandrel is moved from said second position to said intermediate position, said locking means further including a lever release means for moving the lever out of said groove on said rod pusher after said mandrel is moved from said second position to said intermediate position to thereby permit said rod to be moved out of the internal axial bore at the first end of the mandrel.

10. The coldworking tool of claim 9, further comprising biasing means for holding said mandrel within said housing when the coldworking tool is disengaged from the riveting machine.

11. The coldworking tool of claim 10, wherein said biasing means comprises a spring member.

12. The coldworking tool of claim 7, wherein said housing is moveable by said machine, the tool further comprising two or more fingers mounted on the outside of the second end of the housing for gripping a headed fastener and holding the head of the fastener against the housing so that as the housing is moved by the machine toward the coldworked hole, the fastener is inserted into the hole and the fingers expand outward to release the fastener as the fastener is seated in the coldworked hole.

13. The coldworking tool of claim 12, wherein said support means includes a rod slidably receivable within the internal axial bore of said mandrel and a rod pusher attached at one end to said coupling means and engaged with said rod at the other end such that when said coupling means pushes said rod pusher, said rod pusher moves said rod through the internal axial bore of said mandrel to thereby support said mandrel in the original configuration.

14. The coldworking tool of claim 13, wherein said locking means comprises a lever, a biasing means for biasing said lever against said rod pusher, and a groove on said rod pusher for receiving said lever when said rod pusher has pushed said rod through said mandrel such that said rod is held within said mandrel as said mandrel is moved from said second position to said intermediate position, said locking means further including lever release means for moving the lever out of said groove on said rod pusher after said mandrel is moved from said second position to said intermediate position to thereby permit said rod to be moved out of the internal axial bore at the first end of the mandrel.

15. The coldworking tool of claim 14, further comprising biasing means for holding said mandrel within said housing when the coldworking tool is not mounted on the riveting machine.

16. The coldworking tool of claim 15, wherein said biasing means comprises a spring member.

* * * * *